United States Patent [19]

Yoshida et al.

[11] Patent Number: 5,258,483
[45] Date of Patent: Nov. 2, 1993

[54] POLYARYLATE AND PROCESS FOR PREPARING THE SAME

[75] Inventors: Tatsushi Yoshida, Kobe; Shigemi Matsumoto, Akashi; Masahiro Asada, Kobe, all of Japan

[73] Assignee: Kanegafuchi Kagaku Kogyo Kabushiki Kaisha, Osaka

[21] Appl. No.: 688,219

[22] Filed: Apr. 22, 1991

[30] Foreign Application Priority Data

Apr. 23, 1990 [JP] Japan .................................. 2-107075

[51] Int. Cl.$^5$ .................................................. C08G 59/00
[52] U.S. Cl. ........................................ 528/87; 525/65; 525/438
[58] Field of Search ................ 525/65, 438; 528/87

[56] References Cited

U.S. PATENT DOCUMENTS 4,348,500 9/1982 Robeson et al. ...................... 525/65
4,506,064 3/1985 Mark .................................. 528/176
4,663,424 5/1987 Stix et al. .......................... 528/182

Primary Examiner—John Kight, III
Assistant Examiner—Shelley A. Dodson
Attorney, Agent, or Firm—Armstrong, Westerman, Hattori, McLeland & Naughton

[57] ABSTRACT

A polyarylate comprising units derived from an aromatic carboxylic acid compound and units derived from a bisphenol compound and containing an epoxy group. According to the process of the present invention, the polyarylate having epoxy group can be economically prepared. Since the polyarylate of the present invention has epoxy group, it has the reactivity with amino group, hydroxyl group, acid anhydride group, or the like. Therefore, the polyarylate is mixed with another polymer to give a polymer alloy or is utilized as the precursor of a graft-copolymer, utilizing the reactivity.

10 Claims, 3 Drawing Sheets

POLYARYLATE AND PROCESS FOR PREPARING THE SAME

BACKGROUND OF THE INVENTION

The present invention relates to a polyarylate and a preparation process thereof, and more particularly to a polyarylate suitable for use as a reactive polymer, which is mixed with another polymer to give a polymer alloy or as a precursor used for obtaining a block copolymer, and a preparation process thereof.

It has hitherto been known that polyarylates are excellent in heat resistance, mechanical strength, dimensional stability, transparency, optical properties, and the like. Therefore, they have widely used as motor vehicle parts, electronic or electric parts, and the like.

It has been known that the polyarylates are prepared by condensation reaction of aromatic dicarboxylic acids or their derivatives with bisphenols or their derivatives. According to the known preparation methods, the obtained polyarylates have carboxyl group or hydroxyl group as a functional thermal group. Also, according to the known methods, for controlling the molecular weight, or the carboxyl group content or the hydroxyl group content of the polyarylate, phenol or p-(t-butyl)-phenol is used as an agent for controlling the molecular weight.

As polyarylates into which a functional group other than carboxyl group and hydroxyl group is introduced, the following polyarylates have hitherto been known. For instance, Japanese Unexamined Patent Publication No. 50-48097 or No. 60-137925 discloses that for improving the hydrolysis resistance and thermal stability, amide group is introduced into the polyarylate at the polymer ends. Japanese Unexamined Patent Publication No. 61-130335 discloses a polyarylate having dimethylmaleimide group at the polymer ends which is used as a material used for preparing a film capable of increasing the molecular weight under an electromagnetic field, and a preparation process thereof. Japanese Examined Patent Publication No. 63-36336, No. 63-36337 or No. 63-36338 discloses a polyarylate having an unsaturated group at the polymer ends which is used as a reactive oligomer and a raw material for coatings.

The above-mentioned publications disclose a technique wherein the stability of the polyarylate itself is improved, a technique wherein the molecular weight of the polyarylate is increased and a technique wherein the functional group is introduced into the polyarylate for giving the reactivity to the polyarylate with a compound or a polymer capable of conducting addition reaction such as radical reaction. According to these techniques, therefore, it cannot be expected that the polyarylate reacts with a polar group such as amino group, hydroxyl group or an acid anhydride group. Accordingly, it is strongly desired to obtain a reactive polyarylate which can be used as a reactive polymer capable of reacting with an oligomer or a polymer having the above-mentioned polar group to give a polymer alloy or which can be used as a precursor of a block copolymer.

An object of the present invention is to provide a polyarylate which is useful as a reactive polymer used together with another polymer to give a polymer alloy or as a precursor of a block copolymer.

Another object of the present invention is to provide a preparation process thereof.

These and other objects of the present invention will become apparent from the description hereinafter.

SUMMARY OF THE INVENTION

In accordance with the present invention, there is provided a polyarylate comprising units derived from an aromatic dicarboxylic acid compound and units derived from a bisphenol compound and containing an epoxy group.

Also, in accordance with the present invention, there is provided a process for preparing a polyarylate containing epoxy group which comprises:

reacting a polyarylate containing acid chloride group with a compound containing hydroxyl group and epoxy group.

DETAILED DESCRIPTION

Figure 1:
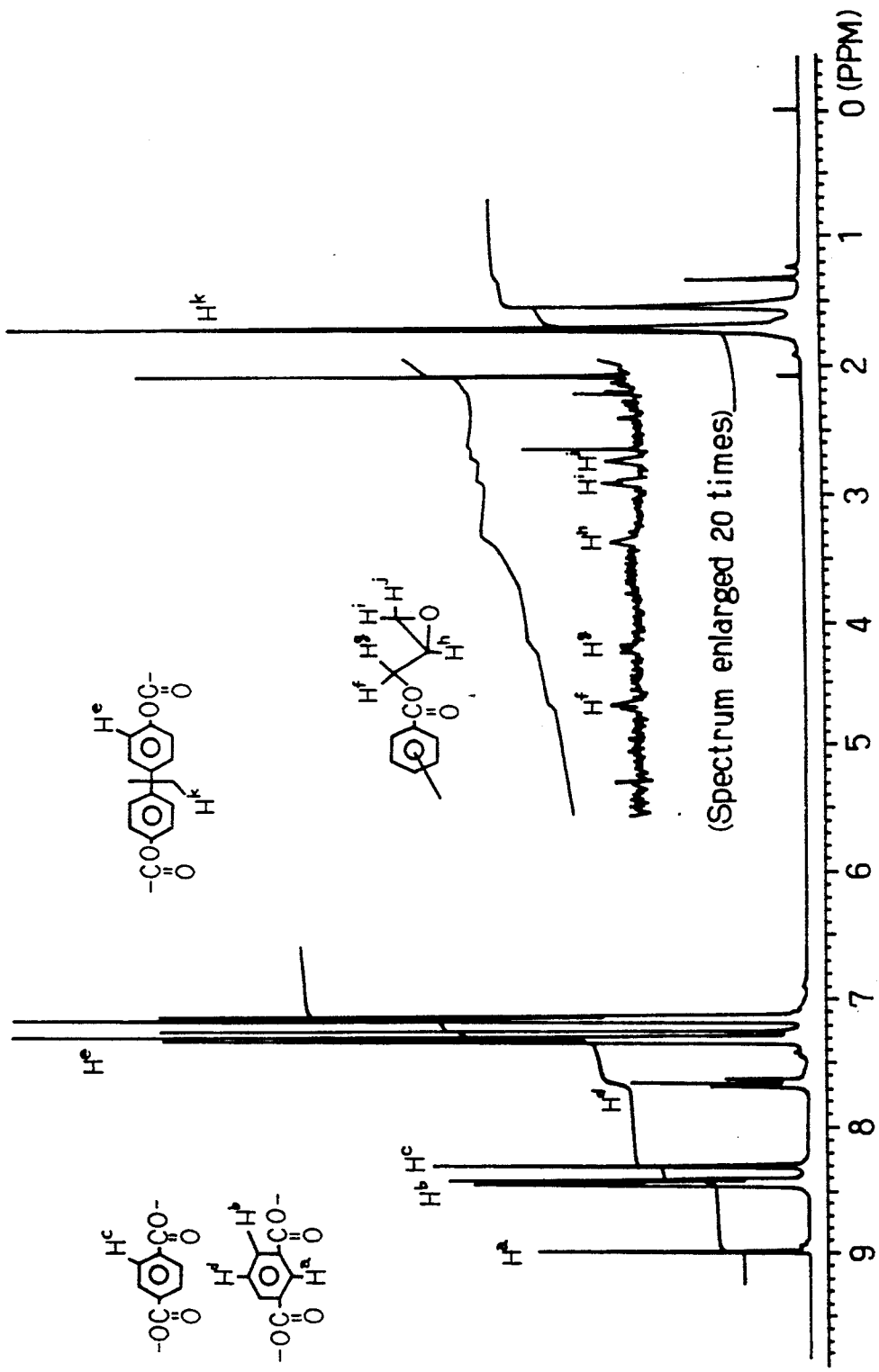
FIG. 1 is an $^1$H-NMR (nuclear magnetic resonance) spectrum of a polyarylate obtained in Example 1.

The polyarylate of the present invention is a polyester comprising units derived from an aromatic dicarboxylic acid compound and units derived from a bisphenol compound, which further contains an epoxy group-containing group derived from an epoxy group-containing compound.

Examples of the units derived from the aromatic dicarboxylic acid are, for instance, units of isophthalic acid, terephthalic acid or phthalic acid from which a moiety eliminated by esterification is removed, and the like. The units are not limited thereto. The polyarylate may contain units derived from two or more kinds of the aromatic dicarboxylic acid as well as units derived from one kind of the aromatic dicarboxylic acid.

Examples of the units derived from the bisphenol compound are, for instance, units of bisphenols represented by the formula (I):

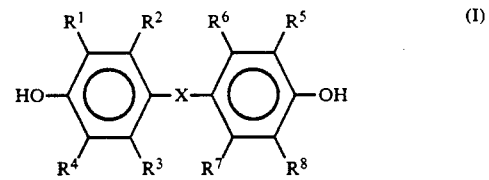

wherein X is —O—, —S—, —SO$_2$—, —CO—, an alkylene group or an alkylidene group or shows direct coupling (the aromatic rings are not bonded through a group but directly bonded to each other), and R$^1$, R$^2$, R$^3$, R$^4$, R$^5$, R$^6$, R$^7$ and R$^8$ are the same or different and each is hydrogen atom, a halogen atom or a hydrocarbon group; condensed polycyclic bisphenols, bisphenolic dyestuffs or dihydroxydinaphthal compounds from which a moiety eliminated by esterification is removed, and the like. The units are not limited thereto. The polyarylate may contain units derived from two or more kinds of the bisphenol compounds as well as units derived from one kind of the bisphenol compound.

It is preferable that the units of the bisphenol represented by the formula (I) from which the moiety eliminated by esterification is removed amount to not less than 50% by mole of the units derived from the bisphenol compound in the polyarylate.

One or more hydrogen atoms attached to the alkylene group or alkylidene group which is one of the groups X of the bisphenol (I) may be substituted by a hydrocarbon group, a halogen atom or a halogenated hydrocarbon group. It is preferable that the alkylene group or alkylidene group which may have the substituent has 1 to 14 carbon atoms. Examples of the alkylene and alkylidene groups are, for instance, methylene group, ethylene group, propylene group, chloromethylene group, dichloromethylene group, bromomethylene group, dibromomethylene group, phenylmethylene group, diphenylmethylene group, difluoromethylene group, cyclohexylene group, ethylidene group, propylidene group, butylidene group, cyclohexylidene group, 1-phenyl-1-ethylidene group, 1-phenyl-2-propylidene group, 1,1,1,3,3,3-hexafluoro-2-propylidene group, 1,1,1,3,3,3-hexachloro-2-propylidene group, and the like.

As the hydrocarbon group which is one kind of the groups from $R^1$ to $R^8$ in the formula (I), an alkyl, aryl, aralkyl, alkoxyl, aryloxy or arylalkoxy group having 1 to 20 carbon atoms, and a halogenated group thereof are preferable. Examples of the hydrocarbon groups are, for instance, an alkyl group such as methyl group, ethyl group, propyl group, isopropyl group, n-butyl group, sec-butyl group or tert-butyl group, an aryl group such as phenyl group or naphthyl group, an aralkyl group such as methylphenyl group or ethylphenyl group, an alkoxyl group such as methoxy group, ethoxy group, propoxy group or butoxy group, an aryloxy group such as phenoxy group or naphthyloxy group, an arylalkoxy group such as phenylmethoxy group or phenylethoxy group, a halogenated group thereof such as chloromethyl group, dichloromethyl group, trichloromethyl group or trifluoromethyl group, and the like.

Examples of the bisphenols having the formula (I) are, for instance, bis(4-hydroxyphenyl)methane, 1,1-bis(4-hydroxyphenyl)ethane, 2,2-bis(4-hydroxyphenyl)propane, 1,1-bis(4-hydroxyphenyl)-1-phenylethane, 1,1-bis(4-hydroxyphenyl)cyclohexane, 2,2-bis(3,5-dimethyl-4-hydroxyphenyl)propane, 2,2-bis(3,5-di-sec-butyl-4-hydroxyphenyl)propane, 2,2-bis(3,5-di-tert-butyl-4-hydroxyphenyl)propane, bis(3,5-dimethyl-4-hydroxyphenyl)methane, 1,1-bis(3,5-dimethyl-4-hydroxyphenyl)ethane, 4,4'-dihydroxydiphenyl ether, bis(4-hydroxyphenyl)sulfide, bis(4-hydroxyphenyl)sulfone, bis(3,5-dimethyl-4-hydroxyphenyl)sulfone, bis(3,5-dimethyl-4-hydroxyphenyl)sulfone, bis(4-hydroxyphenyl)ketone, 4,4'-bishydroxybiphenyl, and the like.

Examples of the condensed polycyclic bisphenols are, for instance, dihydroxynaphthalene, dihydroxyanthracene, and the like. Examples of the phenolic dyestuffs are, for instance, phenolphthalein, fluorescein, and the like. Examples of the dihydroxydinaphthyl compounds are, for instance, 2,2'-dihydroxy-1,1'-dinaphthylmethane, 4,4'-dihydroxydinaphthyl, and the like.

The polyarylate may contain the units derived from two or more kinds of the bisphenol compounds as well as the units derived from one kind of the bisphenol compound.

In the polyarylate of the present invention, a ratio of the units derived from the aromatic dicarboxylic acid compound to the units derived from the bisphenol compound is generally from 100/99 to 100/99, preferably from 100/99 to 100/94.

Examples of the epoxy group-containing groups derived from the epoxy group-containing compound are, for instance, a unit of a compound having both hydroxyl group and epoxy group in its molecule from which a moiety eliminated by reaction is removed, and the like. The groups are not limited thereto.

Examples of the epoxy group-containing compounds are, for instance, an aliphatic or alicyclic compound such as 2,3-epoxy-1-propanol, 3,4-epoxy-1-butanol, 3,4-epoxy-cyclohexanol, ethyleneglycol monoglycidyl ether or tetramethyleneglycol monoglycidyl ether, an aromatic compound such as 4-(1',2'-epoxyethyl) phenol, glycidyl p-hydroxylbenzoate or 2,2-bis(4-hydroxyphenyl)propane monoglycidyl ether, and the like. The polyarylate may contain the epoxy group-containing groups derived from two or more kinds of the epoxy group-containing compounds as well as the groups derived from one kind of the epoxy group-containing compound.

The preferable amount of the epoxy groups in the polyarylate of the present invention varies depending on the objects of its use. Generally, the polyarylate has an epoxy value of $10 \times 10^{-6}$ to $1000 \times 10^{-6}$ equivalent/g, preferably from $20 \times 10^{-6}$ to $500 \times 10^{-6}$ equivalent/g, more preferably from $50 \times 10^{-6}$ to $300 \times 10^{-6}$ equivalent/g. The term "epoxy value" used herein means equivalents of epoxy groups contained in 1 g of the polyarylate. When the epoxy value is less than $10 \times 10^{-6}$ equivalent/g, the reactivity as the reactive polymer is lowered. On the other hand, when the epoxy value is more than $1000 \times 10^{-6}$ equivalent/g, the molecular weight is so low that it is difficult that the physical properties required as the polymer can be exhibited.

The epoxy value is calculated according to ISO (International Organization for Standardization) -3001, (measuring method for epoxy value of an epoxy resin), using the following equation:

$$\text{Epoxy value (equivalent/g)} = \left[ (Ts - Tb) \times \frac{0.1 \times F}{1000} \right] / W$$

wherein Ts is an amount of a 0.1N acetic acid solution of HCl O$_4$ consumed in titration of a sample (ml), Tb is an amount of 0.1N acetic acid solution of HCl O$_4$ consumed in blank test, F is a titrimetric factor of 0.1N acetic acid solution of HCl O$_4$, and W is a weight of the sample (g).

In the present invention, a preferable range of a weight average molecular weight of the polyarylate varies depending on the objects of its use, and is not generally decided. The polyarylate is used according to the use, selecting suitably from the polyarylates having a weight average molecular weight according to gel permeation chromatography (GPC), calculated in terms of polystyrene, of preferably from 3,000 to 150,000, more preferably from 5,000 to 120,000. When the weight average molecular weight is less than 3,000, it is difficult to exhibit the physical properties to be required as the polymer. On the other hand, the molecular weight is more than 150,000, the number of the functional groups which can be introduced to the polyarylate is substantially decreased, and the epoxy value is lowered.

The polyarylate of the present invention may contain units other than the units derived from the aromatic dicarboxylic acid compound, the units derived from the bisphenol compound and the epoxy group-containing groups, within the range of not more than 10% by mole, preferably not more than 5% by mole. Examples of the other units are, for instance, units derived from a monofunctional phenol, units derived from a monofunctional carboxylic acid, units derived from an aromatic diamine, and the like.

The units derived from the monofunctional phenol are units derived from the component used as the agent for controlling the molecular weight of the polyarylate. Examples of the monofunctional phenols are, for instance, phenol, p-(tert-butyl)phenol, and the like.

An embodiment of the preparation method of the polyarylate of the present invention is explained as follows:

In the present invention, the polyarylate having the epoxy group-containing group at the polymer ends can be prepared by reacting a polyarylate having acid chloride group, which is a preferable embodiment, with a compound having both hydroxyl group and epoxy group in its molecule.

The polyarylate having acid chloride group can be prepared by reacting an aromatic dicarboxylic acid chloride with a bisphenol compound and another phenol compound used as occasion demands in an amount of the acid chloride, based on the amount of the functional groups, more than the theoretical equivalent to the total of the bisphenol compound and the phenol compound used as occasion demands, as discussed in Japanese Unexamined Patent Publication No. 1-228951.

As the aromatic dicarboxylic acid chloride, there are exemplified, for instance, terephthaloyl dichloride, isophthaloyl dichloride, phthaloyl dichloride, and the like. The carboxylic acid chloride is not limited thereto.

As the bisphenol compound used in the preparation of the polyarylate as mentioned above, there are exemplified, for instance, above-mentioned the bisphenols having the formula (I):

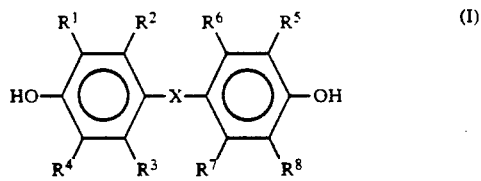

wherein X, $R^1$, $R^2$, $R^3$, $R^4$, $R^5$, $R^6$, $R^7$ and $R^8$ are as defined above, the above-mentioned condensed polycyclic bisphenols, the above-mentioned bisphenolic dyestuffs, the above-mentioned dihydroxydinaphthyl compounds, and the like. The bisphenol compound is not limited thereto.

Since the epoxy value and the weight average molecular weight of the objective polyarylate having the epoxy group-containing group depend on the polyarylate having acid chloride group, it is preferable that the polyarylate containing acid chloride group has an acid chloride value (equivalent of acid chloride group contained in 1 g of the polymer) of from $10 \times 10^{-6}$ to $1000 \times 10^{-6}$ equivalent/g. When the acid chloride value is less than $10 \times 10^{-6}$ equivalent/g, the epoxy value of the polyarylate prepared therefrom is small. On the other hand, when the acid chloride value is more than $1000 \times 10^{-6}$ equivalent/g, the molecular weight of the prepared polyarylate therefrom is too low.

The acid chloride value is calculated as follows:

A sample (polyarylate) having an amount of about 0.1 g is weighed exactly and 10 ml of chloroform is added to the sample to dissolve. To the solution are added 2 ml of methanol and a small amount of 0.2% methanol solution of Thymol Blue as the indicator, and the mixture is stirred at room temperature for 60 minutes to react. The liberated hydrogen chloride is titrated with 0.1N chloroform solution of tributyl amine as the end point at which the titrate changes from pink to yellow. Separately, the blank test is carried out without using the sample.

The acid chloride value is calculated by the following equation:

Acid chloride value
(equivalent/g)=$[(Ts-Tb) \times 0.1 \times F \times 10^{-3}]/W$ wherein Ts is an amount of 0.1N chloroform solution of tributyl amine consumed in titration (ml), Tb is an amount of 0.1N chloroform solution of tributyl amine consumed in blank test (ml), F is a titrimetric factor of 0.1N chloroform solution of tributyl amine and W is a weight of the sample (polyarylate)(g).

The polyarylate having acid chloride group is reacted with the compound having both hydroxyl group and epoxy group, for instance, in a manner wherein the two components is reacted in the presence of an acid acceptor in which hydrogen chloride eliminated by the reaction is trapped, in other words, in the similar manner as the reaction of acid chloride group of a low molecular weight compound with hydroxyl group of a low molecular weight compound. Concretely, the polyarylate having acid chloride group is dissolved in an organic solvent substantially immiscible with water, and the compound having both hydroxyl group and epoxy group is added to the organic solution in the presence of the acid acceptor. Examples of the organic solvents are, for instance, methylene chloride, 1,2-dichloroethane, chloroform, 1,1,2-trichloroethane, 1,1,2,2-tetrachloroethane chlorobenzene, o-dichlorobenzene, and the like.

Examples of the compounds having both hydroxyl group and epoxy group to be reacted with the polyarylate having acid chloride group are, for instance, an aliphatic or alicyclic compound such as 2,3-epoxy-1-propanol, 3,4-epoxy-1-butanol, 3,4-epoxy-cyclohexanol, ethyleneglycol monoglycidyl ether or tetramethyleneglycol monoglycidyl ether, an aromatic compound such as 4-(1',2'-epoxyethyl)phenol, glycidyl p-hydroxybenzoate or 2,2-bis(4-hydroxyphenyl)propane monoglycidyl ether, and the like. The compound is not limited thereto.

It is preferable that the amount of the compound having both hydroxyl group and epoxy group is from 1 to 20 moles per mole of acid chloride group in the polyarylate in order to sufficiently react the polyarylate having acid chloride group with the compound having both hydroxyl group and epoxy group. More preferably, the amount of the compound having both hydroxyl group and epoxy group is from 1 to 10 moles per mole of acid chloride group from the viewpoint of removal of the unreacted compounds in post-treatment.

The compound having both hydroxyl group and epoxy group may be added to the polyarylate having acid chloride group as it is, or in the state of a solution using the same organic solvent as the solvent dissolving the polyarylate having acid chloride group.

As the acid acceptor, an alkaline aqueous solution or tertiary amine can be used.

Examples of the alkaline aqueous solutions are, for instance, an aqueous solution containing at least one member selected from the group consisting of a hydroxide, a carbonate, a hydrogencarbonate and a phosphate of an alkali metal and a hydroxide, a carbonate, a hydrogencarbonate and a phosphate of an alkaline earth metal. Among them, the hydroxides of the alkali metals are preferable from the viewpoint of the reaction rate or the easiness of treatment after completing the reaction.

Examples of the tertiary amines are, for instance, an aliphatic tertiary amine such as trimethylamine, triethylamine, tri-n-butylamine or 1,4-diazabicyclo-[2,2,2]-octane, a nitrogen-containing heterocyclic compound such as pyridine, 2,6-lutidine or quinoline, and the like. Among them, triethylamine, tri-n-butylamine and pyridine are preferable from the viewpoint of the reaction rate or the easiness of the removal of the hydrochloric acid salt or non-reacted amines. The tertiary amine may be used as it is or in the state of a solution using the same organic solvent as the solvent dissolving the polyarylate.

The acid acceptor is used in an amount equal to or more than moles of acid chloride groups of the polyarylate having acid chloride group, in order to attain the object that a produced hydrochloric acid by the reaction is trapped. When using the tertiary amine, since it is easy that the non-reacted amine remains after completing the reaction, it is preferable that the tertiary amine is used in an amount of 1 to 3 moles, more preferably from 1.1 to 2 moles, per mole of the acid chloride group of the polyarylate having acid chloride group so that the remaining amine does not exert bad-influence in the purification step, the drying step, or the subsequent step wherein another polymer is mixed to give a polymer alloy or step of copolymerization reaction.

In the reaction of the polyarylate having acid chloride group with the compound having both hydroxyl group and epoxy group, for instance, the polyarylate is dissolved in the organic solvent, then the acid acceptor is added thereto, and the compound having both hydroxyl group and epoxy group is added to the resulting mixture. When adding the acid acceptor, it is preferable that the solution of polyarylate and the acid acceptor are previously cooled to a temperature of 5° to 30° C. for inhibiting the hydrolysis of the acid chloride. When adding the compound having hydroxyl group and epoxy group, it is preferable that the solution containing the polyarylate and the compound having hydroxyl group and epoxy group are previously cooled to a temperature of 5° to 30° C. for inhibiting the hydrolysis of the acid chloride. The time requiring for the addition of the compound having hydroxyl group and epoxy group is not particularly limited. The compound can be added rapidly or over several minutes with stirring.

The reaction time varies depending on the amount of acid chloride groups, the kinds or amount of the compound having both hydroxyl group and epoxy group, the molecular weight of the used polyarylate, the reaction temperature, and the like. Generally, the reaction time is from several minutes to several hours.

It is preferable that the reaction temperature is not higher than 60° C., more preferably from 5° to 30° C.

After completing the reaction, when the alkaline aqueous solution is used, the reaction mixture is allowed to stand as it is to separate into an aqueous layer and an organic layer containing the desired polymer or is mechanically separated into the two layers, then the aqueous layer is decanted. Subsequently, after the neutralization, the filtration, the extraction and the washing are conducted as occasion demands, the resulting mixture is added to a poor solvent such as acetone or methanol, the solvent is evaporated by using a thin film evaporator or an aqueous solution of a dispersing agent such as polyvinyl alcohol is added to the mixture to dispersion-concentrate, thus, the desired polyarylate is isolated. When using the tertiary amine, the step wherein the reaction mixture is separated into the aqueous layer and the organic layer is not required.

The present invention is more specifically described and explained by means of the following Examples, in which all % and parts are by weight unless otherwise noted. It is to be understood that the present invention is not limited to the Examples and various changes and modifications may be made in the invention without departing from the spirit and scope thereof.

EXAMPLE 1

A 6 l flask was charged with 678.0 g (2.97 moles) of 2,2-bis(4-hydroxyphenyl)propane, 9.0 g (0.06 mole) of p-(t-butyl)phenol, 5.28 g of sodium hydrosulfite, 1920 ml of 4N sodium hydroxide and 3320 ml of water, and the mixture was stirred in an atmosphere of nitrogen, then was cooled to 5° C. to prepare an alkaline aqueous solution containing the bisphenol.

Separately, in a 6 l flask, 125.5 g (0.618 mole) of terephthaloyl chloride and 501.9 g (2.472 moles) of isophthaloyl chloride were dissolved in 5000 ml of methylene chloride, and the mixture was cooled to 5° C.

A 15 l separable flask was charged with 2000 ml of water and 0.94 g (0.03 mole) of benzyltributyl ammonium chloride as a catalyst in an atmosphere of nitrogen, and the mixture was cooled to 5° C. The solution containing the bisphenol and the solution containing terephthaloyl chloride and isophthaloyl chloride, which were previously prepared as shown above, were continuously and simultaneously to the solution containing the catalyst by using a pump over 15 minutes, while violently stirring the solution containing the catalyst.

After completing the addition, the mixture was stirred for 60 minutes, then the stirring was stopped to separate into a methylene chloride layer and an aqueous layer. After decanting the aqueous layer, 5000 ml of water was added and it was neutralized with a small amount of hydrochloric acid with stirring. After repeating the desalting by washing with water, 5000 ml of acetone was gradually added to the methylene chloride layer to precipitate a polymer powder. After the precipitate was filtered, it was washed with 5000 ml of acetone, then 5000 ml of water and the powder was filtered off.

The dried polymer powder had an acid chloride value of $71 \times 10^{-6}$ equivalent/g, and a weight average molecular weight according to GPC, calculated in terms of polystyrene, of 62,000.

A 15 l separable flask was charged with 1000 g of the obtained polymer powder, to which 5000 ml of methylene chloride was added, and the mixture was refluxed with stirring to dissolve the polymer powder. After the mixture assumed transparent by completely dissolving the polymer in methylene chloride, it was cooled to 5° C. Then, 355 ml (1.42 moles) of 4N sodium hydroxide and 5000 ml of water which were previously cooled to 5° C. were added to the transparent solution, and a solution wherein 52.5 g (0.71 mole) of 2,3-epoxy-1-propanol was dissolved in 500 ml of methylene chloride was added to the mixture while violently stirring.

After completing the addition, the stirring was continued for 60 minutes, and the stirring was stopped to separate into a methylene chloride layer and an aqueous layer. After decanting the aqueous layer, neutralization, the washing, the reprecipitation with acetone, filtration, washing, filtration and drying were conducted in the same manner as in the preparation of the polyarylating containing acid chloride group.

The obtained polymer had an epoxy value of $63 \times 10^{-6}$ equivalent/g.

The epoxy value was measured as follows:

Measurement of Epoxy Value

About 0.2 g of a sample polymer is exactly weighed and is dissolved in 20 ml of chloroform. To the obtained solution are added 10 ml of a 25% acetic acid solution of tetraethyl ammonium bromide and a small amount of a 0.1% acetic acid solution of Crystal Violet as an titrate. The violet solution containing the sample is rapidly titrated with a 0.1N acetic acid solution of $HClO_4$ as the end point at which the titrate changes to bluish green. Separately, the blank test is conducted without using the sample. The epoxy value is calculated, using the following equation:

$$\text{Epoxy value (equivalent/g)} = \left[ (Ts - Tb) \times \frac{0.1 \times F}{1000} \right] / W$$

wherein Ts, Tb, F and W are as defined above.

A weight average molecular weight of the obtained polyarylate was 62,000.

$^1$H-NMR spectrum (300 MHz) of the obtained polyarylate is shown in FIG. 1. Proton signals for glycidyl ester unit of aromatic carboxylic acid was confirmed in the $^1$H-NMR spectrum as shown in FIG. 1.

Figure 3A:
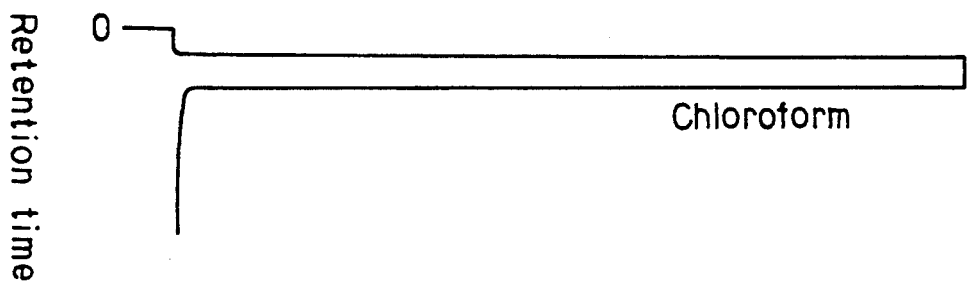
FIG. 3a shows results of gas chromatography of the polyarylate obtained in Example 1.
Figure 3B:
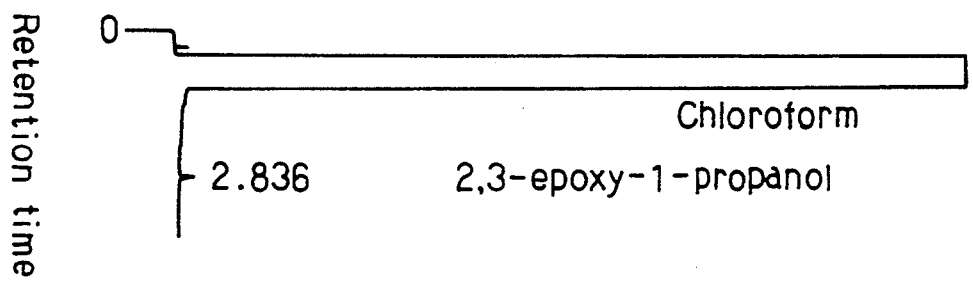
FIG. 3b and FIG. 3c show results of gas chromatography of 2,3-epoxy-1-propanol (11 ppm and 100 ppm, respectively).
Figure 3C:
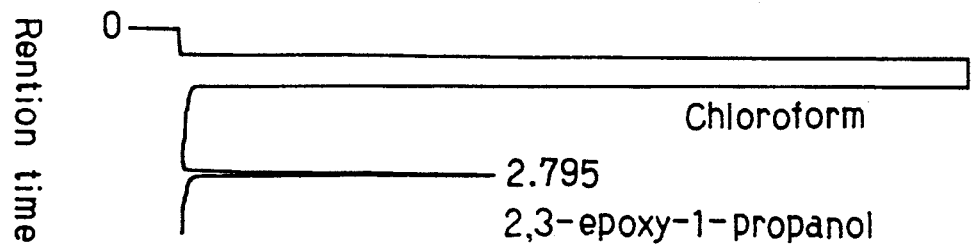

Also, the results of gas chromatography of the obtained polyarylate are shown in FIG. 3a. The measuring conditions are as follows:
Type of analyser: YHP GC-5890
Column: DBWAX-15 m 0.5 mmϕ (made by J & W)
Column temperature: 100° C.→130° C.
Injection temperature: 120° C.
Detection temperature: 120° C.
Column flow rate: 10 to 11 ml/minute
Injection amount: 1 μl
Concentration of the sample: 0.1 g/5 ml CHCl$_3$ As apparent from the comparisons with results of charts obtained by measuring chloroform solutions of 2,3-epoxy-1-propanol (11 ppm and 100 ppm, respectively), a remaining non-reacted 2,3-epoxy-1-propanol was not detected at all. Therefore, it was understood that the measured epoxy value did not originate from free 2,3-epoxy-1-propanol.

EXAMPLE 2

The procedure of Example 1 was repeated except that 339.0 g (1.485 moles) of 2,2-bis(4-hydroxyphenyl)-propane and 431.1 g (1.485 moles) of 1,1-bis(4-hydroxyphenyl)phenyl ethane were used as the bisphenols, and 627.3 g (3.09 moles) of isophthaloyl chloride was used as the acid chloride to give a polymer powder.

The obtained polymer had an acid chloride value of $70 \times 10^{-6}$ equivalent/g and a weight average molecular weight of 60,000.

A methylene chloride solution containing 1000 g of the obtained polymer having acid chloride group was prepared in the same manner as in Example 1, and it was cooled to 5° C., to which a solution of 51.8 g (0.70 mole) of 2,3-epoxy-1-propanol dissolved in 500 ml of methylene chloride and a solution of 7.79 g (0.077 mole) of triethylamine dissolved in 50 ml of methylene chloride were added while stirring.

After 60 minutes from the completion of the addition, 5000 ml of acetone was gradually added to the reaction mixture to precipitate a polymer powder. After filtering off the precipitate, it was washed with 5000 ml of acetone, and the polymer powder was filtered off.

The obtained polyarylate powder had an epoxy value of $69 \times 10^{-6}$ equivalent/g and a weight average molecular weight of 61,000.

As to the obtained polyarylate, $^1$H-NMR spectrum was measured. As a result, proton signals for glycidyl ester unit of aromatic carboxylic acid was confirmed in the $^1$H-NMR spectrum, alike the polymer obtained in Example 1. Also, as to the obtained polyarylate, gas chromatography analysis was conducted. As a result, a remaining non-reacted 2,3-epoxy-1-propanol was not detected.

EXAMPLE 3

The procedure of Example 1 was repeated except that 684.9 g (3.0 moles) of 2,2-bis(4-hydroxyphenyl)propane was used as the bisphenol, and 127.9 g (0.63 mole) of terephthaloyl chloride and 511.6 g (2.52 moles) of isophthaloyl chloride were used as the acid chlorides, and p-(t-butyl)phenol was not used to give a polymer powder.

The obtained polymer had an acid chloride value of $120 \times 10^{-6}$ equivalent/g and a weight average molecular weight of 76,000.

A methylene chloride solution containing 1000 g of the obtained polymer powder having acid chloride group was prepared in the same manner as in Example 2, and using the thus obtained solution, a white polymer powder was prepared in the same manner as in Example 2 except that a solution of 88.8 g (1.20 moles) of 2,3-epoxy-1-propanol dissolved in 500 ml of methylene chloride and a solution of 13.3 g (0.132 mole) of triethylamine dissolved in 50 ml of methylene chloride were used.

The obtained polyarylate powder had an epoxy value of $115 \times 10^{-6}$ equivalent/g and a weight average molecular weight of 77,000.

As to the obtained polyarylate, $^1$H-NMR spectrum was measured. As a result, proton signals for glycidyl ester unit of aromatic carboxylic acid was confirmed in the $^1$H-NMR spectrum, alike the polymer obtained in Example 1. Also, the polyarylate was analyzed according to gas chromatography. As a result, a remaining non-reacted 2,3-epoxy-1-propanol was not detected at all.

COMPARATIVE EXAMPLE 1

The procedure of Example 1 was repeated except that 667.7 g (2.925 moles) of 2,2-bis(4-hydroxyphenyl)-propane and 22.5 g (0.15 mole) of p-(t-butyl)phenol were used as the bisphenols, and 121.8 g (0.6 mole) of isophthaloyl chloride was used as the acid chloride to give a polymer powder.

The obtained polymer had an acid chloride value of 0 equivalent/g and a weight average molecular weight of 64,000.

A methylene chloride solution containing 1000 g of the obtained polymer having acid chloride group was prepared in the same manner as in Example 2, and using the thus obtained solution, a white polymer powder was prepared in the same manner as in Example 2 except that a solution of 88.8 g (1.20 moles) of 2,3-epoxy-1-propanol dissolved in 500 ml of methylene chloride and a solution of 13.3 g (0.132 mole) of triethylamine dissolved in 50 ml of methylene chloride were used.

The obtained polyarylate powder had an epoxy value of 0 equivalent/g and a weight average molecular weight of 63,000.

Figure 2:
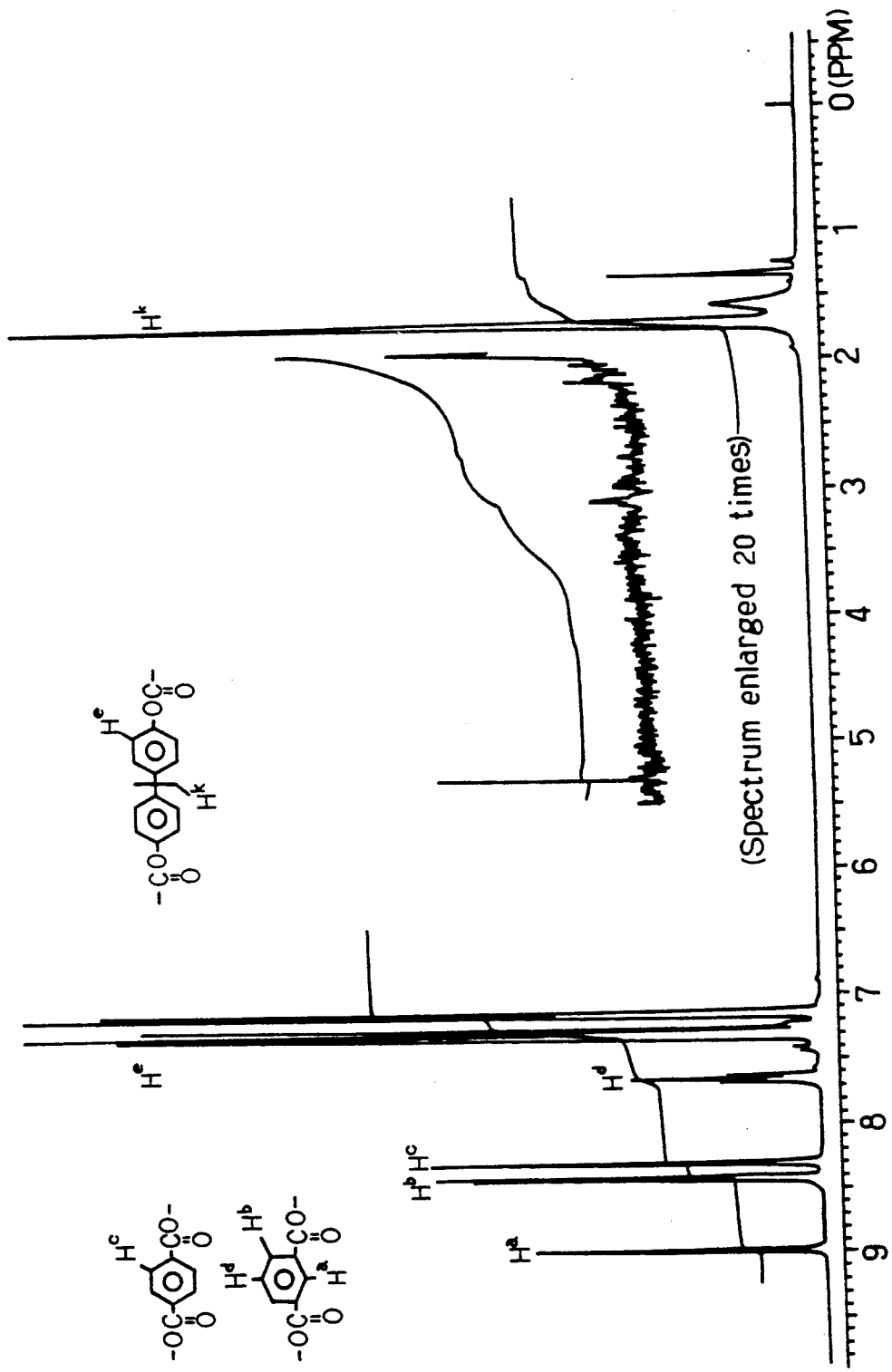
FIG. 2 is an $^1$H-NMR spectrum of a polyarylate obtained in Comparative Example 1.

$^1$H-NMR spectrum (300 MH$_Z$) of the obtained polyarylate is shown in FIG. 2. As shown in FIG. 2, proton signals for glycidyl ester unit of aromatic carboxylic acid was not detected at all.

COMPARATIVE EXAMPLE 2

The procedure of Example 1 was repeated except that the alkaline aqueous solution of the bisphenol and the methylene chloride solution of the acid chloride were added to the 15 l separable flask with which the catalyst and water were charged by using the pump, and immediately after the completion of the above addition, the solution of 52.5 g (0.71 mole) of 2,3-epoxy-1-propanol dissolved in 500 ml of methylene chloride to give a polymer powder.

The obtained polyarylate had an epoxy value of 0 equivalent/g and a weight average molecular weight of 40,000. As to the obtained polymer, $^1$H-NMR spectrum was measured. As a result, proton signals for glycidyl ester unit of aromatic carboxylic acid was not detected in $^1$H-NMR spectrum.

From the results of Examples from 1 to 3 and Comparative Examples 1 and 2, it would be recognized that epoxy group can be introduced into the polyarlate according to the process of the present invention.

According to the process of the present invention, the polyarylate containing epoxy group can be economically prepared. Since the thus obtained polyarylate has epoxy group, it has the reactivity with amino group, hydroxyl group or acid anhydride group which does not exist in the known polyarylates. Accordingly, the polyarylate of the present invention is mixed with another polymer to give a polymer alloy or is utilized as the precursor of the block copolymer, utilizing the reactivity.

In addition to the ingredients used in the Examples, other ingredients can be used in the Examples as set forth in the specification to obtain substantially the same results.

What we claim is:

1. A polyarylate polymer comprising units derived from an aromatic carboxylic acid compound and units derived from a bisphenol compound, said polyarylate polymer having an epoxy-containing terminal group introduced by the reaction between a terminal carboxyl group of the unit of said aromatic carboxylic acid compound and a hydroxyl group of a compound having both a hydroxyl group and an epoxy group.

2. The polyarylate of claim 1, wherein said polyarylate has an epoxy value of $10 \times 10^{-6}$ to $1,000 \times 10^{-6}$ equivalent/g.

3. The polyarylate of claim 1, wherein said polyarylate has a weight average molecular weight, calculated in terms of polystyrene, of 3,000 to 150,000.

4. A process for preparing an epoxy terminal group-containing polyarylate polymer which comprises reacting an acid chloride group-containing polyarylate with a compound having both a hydroxyl group and an epoxy group in the presence of at least one mole of an acid acceptor per mole of acid chloride.

5. The process of claim 4, wherein said reaction is conducted in the presence of an alkaline aqueous solution.

6. The process of claim 4, wherein said reaction is conducted in the presence of a tertiary amine.

7. A process for preparing an epoxy terminal group-containing polyarylate polymer which comprises reacting an acid chloride group-containing polyarylate with a compound having both a hydroxyl group and an epoxy group in the presence of an alkaline aqueous solution containing at least one mole of alkali per mole of acid chloride or in the presence of at least one mole of a tertiary amine per mole of the acid chloride at a temperature of not more than 60° C.

8. The process of claim 7, wherein said reaction is conducted at 5° to 30° C.

9. The polyarylate polymer of claim 1, wherein said epoxy-containing terminal group is a member selected from the group consisting of a group of the formula (1):

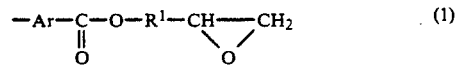

wherein Ar is a residue of said aromatic carboxylic acid compound, and $R^1$ is a bivalent hydrocarbon group having 1 to 20 carbon atoms; a group of the formula (2):

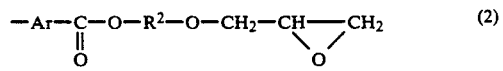

wherein Ar is as defined above, and $R^2$ is a bivalent hydrocarbon group having 1 to 20 carbon atoms; a group of the formula (3):

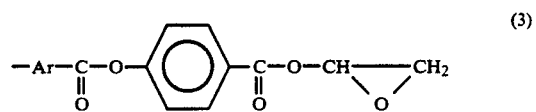

wherein Ar is as defined above; and a group of the formula (4):

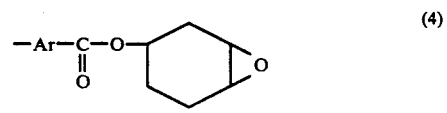

wherein Ar is as defined above.

10. The process of claim 4, wherein said epoxy-containing terminal group is a member selected from the group consisting of a group of the formula (1):

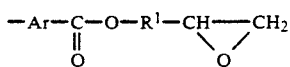
(1)
wherein Ar is a residue of said aromatic carboxylic acid compound, and $R^1$ is a bivalent hydrocarbon group having 1 to 20 carbon atoms; a group of the formula (2):
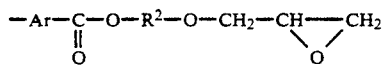
(2)
wherein Ar is as defined above, and $R^2$ is a bivalent hydrocarbon group having 1 to 20 carbon atoms; a group of the formula (3):
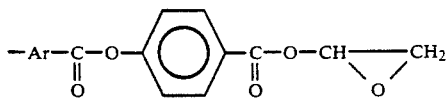
(3)
wherein Ar is as defined above; and a group of the formula (4):
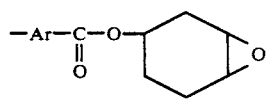
(4)
wherein Ar is as defined above.
* * * * *